United States Patent [19]
Kishi et al.

[11] Patent Number: 5,623,295
[45] Date of Patent: Apr. 22, 1997

[54] INFORMATION RECORDING REPRODUCING APPARATUS USING PROBE

[75] Inventors: Etsuro Kishi, Sagamihara; Hisaaki Kawade, Yokohama; Kiyoshi Takimoto, Isehara; Koji Yano, Zama, all of Japan

[73] Assignee: Canon Kabushiki Kaisha, Tokyo, Japan

[21] Appl. No.: 201,909

[22] Filed: Feb. 25, 1994

[30] Foreign Application Priority Data

Mar. 1, 1993 [JP] Japan .................................... 5-040183

[51] Int. Cl.⁶ ................................................. G01D 15/06
[52] U.S. Cl. .......................... 347/111; 347/112; 365/151; 369/126; 250/306
[58] Field of Search ............................ 365/151, 55, 118, 365/171, 225.5; 347/111, 112; 360/55–62, 114; 369/101, 126; 250/302, 306

[56] References Cited

U.S. PATENT DOCUMENTS

| | | | |
|---|---|---|---|
| 4,575,822 | 3/1986 | Quate | 365/174 |
| 5,144,581 | 9/1992 | Toda et al. | 365/151 |
| 5,204,851 | 4/1993 | Kawada et al. | 369/126 |
| 5,241,527 | 8/1993 | Eguchi et al. | 369/126 |
| 5,251,200 | 10/1993 | Hatanaka et al. | 369/126 |
| 5,278,704 | 1/1994 | Matsuda et al. | 360/55 |
| 5,287,342 | 2/1994 | Kishi et al. | 369/126 |

FOREIGN PATENT DOCUMENTS

| | | |
|---|---|---|
| 0382062 | 8/1990 | European Pat. Off. . |
| 0468456 | 1/1992 | European Pat. Off. . |
| 63-161552 | 7/1988 | Japan . |
| 63-161553 | 7/1988 | Japan . |

*Primary Examiner*—Benjamin R. Fuller
*Assistant Examiner*—L. Anderson
*Attorney, Agent, or Firm*—Fitzpatrick, Cella, Harper & Scinto

[57] ABSTRACT

An information recording and/or reproducing apparatus for recording and/or reproducing information to/from a recording medium in a scanning probe microscope comprises a circuit to reproduce recording bits formed on the recording medium on the basis of a physical amount such as tunnel current, interatomic force, electrostatic force, or magnetic force which occurs between the probe and the recording medium, a sensor to detect a state such as film thickness or film quality of the recording medium on the basis of the physical amount before the recording bits are reproduced, and a correcting circuit to correct reproducing conditions such as a magnitude of a voltage which is applied between the probe and the medium on the basis of the detected state of the medium.

4 Claims, 8 Drawing Sheets

REPRODUCTION BIAS SIGNAL

DETECTION CURRENT

REPRODUCTION TIMING SIGNAL

REPRODUCTION SAMPLING DATA

REPRODUCTION RECONSTRUCTION DATA

REPRODUCTION BIAS SAMPLE AND HOLD SIGNAL

REPRODUCTION BIAS SIGNAL

DETECTION CURRENT

REPRODUCTION TIMING SIGNAL

REPRODUCTION SAMPLING DATA

REPRODUCTION RECONSTRUCTION DATA

REPRODUCTION BIAS SIGNAL

DETECTION CURRENT

JUDGEMENT LEVEL TIMING SIGNAL

JUDGEMENT LEVEL SIGNAL

REPRODUCTION TIMING SIGNAL

REPRODUCTION SAMPLING DATA

REPRODUCTION RECONSTRUCTION DATA

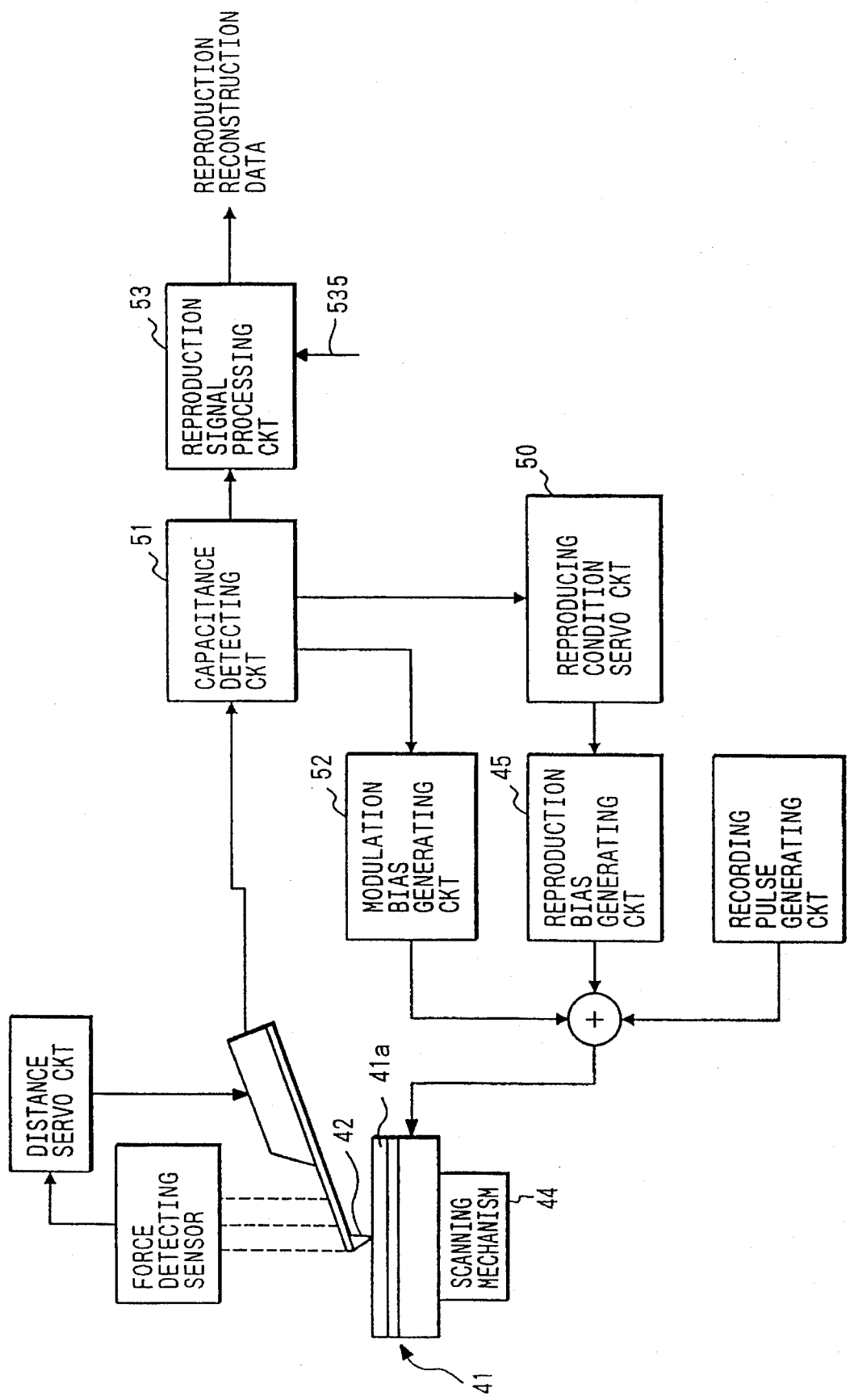

INFORMATION RECORDING REPRODUCING APPARATUS USING PROBE

BACKGROUND OF THE INVENTION

1. Field of the Invention

The present invention relates to a recording and reproducing apparatus for recording and/or reproducing information by using a scanning probe microscope for detecting surface information of a sample by a tunnel current, force, or the like which is generated between the probe and the sample.

The information recording and reproducing apparatus of the invention incorporates each of an apparatus for performing only the reproduction of information and an apparatus for executing both of the recording and reproduction of information.

2. Related Background Art

Scanning probe microscopes (hereinafter, simply referred to as an "SPM") are classified into several types in accordance with physical properties which are detected. A number of various kinds of physical amounts such as force, light, electrostatic capacitance, and the like, like a tunnel current, an interatomic force, an electrostatic force, a magnetic force, and the like are used as targets to be detected. In all of those cases, they are common in terms of a point that the physical amount is detected by a probe having a sharp tip. The SPM has rapidly developed in recent years as a detecting method which indicates a high space resolution of 0.1 to tens of nm.

In association with the development of the SPM, many techniques about a recording and reproducing apparatus to which the principle of the SPM is applied have been proposed so far. By effectively utilizing the high space resolution of the SPM, ultramicro recording bits each having a size of one to hundreds of nm can be formed and reproduced by a stimulus such as current, electric field, force, and the like which is generated between a probe and a local region of a recording layer. A recording density can be remarkably raised.

The recording method is mainly classified into a method of giving a physical shape change to the surface of the recording layer and a method of giving a change in electrical, magnetic, chemical, or optical state to the surface of the recording layer. As the former method, there can be mentioned a method of giving a physical deformation by the probe, a method of giving a thermal deformation by a high energy beam such as a laser beam, an electron beam, or the like, a method using an electric field evaporation by a high electric field, a method of depositing micro particles, or the like. As the latter method, there can be mentioned a method using an electrical switching phenomenon which has been found out in an organic compound of the π electron system or a chalcogen compound (JP-A-63-161552, JP-A-63-161553), a method using a charge accumulation in a silicon nitride film (of U.S. Pat. No. 4,575,822), a method using various kinds of oxidation reduction reactions of a transition metal oxide, viologen, styryl class compound, rare earth diphthalo cyanine, polyaniline, polythiophene, polypyrrole, metal-TCNQ charge-transfer complex, or the like, a method using a crystal phase/amorphous phase change using a crystallized glass of the vanadium oxide system, or the like.

An example of the conventional recording and reproducing apparatus will now be described with reference to FIG. 1. FIG. 1 is a schematic block diagram of an example of the conventional recording and reproducing apparatus. The apparatus shown in FIG. 1 has: a probe 102 supported to a probe fine-moving mechanism 104 through an elastic member 103; and a recording medium 101 arranged so as to face the probe 102. A tunnel current which is generated between the probe 102 and a recording layer 101a of the recording medium 101 is detected by a current detecting circuit 108. The tunnel current is supplied as a servo signal to a distance servo circuit 107, thereby controlling the distance between the probe 102 and the recording layer 101a. A recording pulse generating circuit 106 generates a voltage pulse to a portion between the probe 102 and the recording layer 101a, thereby forming a recording bit onto the recording layer 101a. On the other hand, while a bias voltage is applied to the portion between the probe 102 and the recording layer 101a by a reproduction bias generating circuit 105, the tunnel current flowing between the probe 102 and the recording layer 101a is detected by the current detecting circuit 108. By performing a predetermined process to the detected tunnel current by a reproduction signal processing circuit 113, reproduction reconstruction data is formed.

Another example of the conventional recording and reproducing apparatus will now be described with reference to FIG. 2. FIG. 2 is a schematic block diagram of another example of the conventional recording and reproducing apparatus. In the apparatus shown in FIG. 2, an interatomic force which is generated between a probe 122 and a recording layer 121a is detected by a force detecting sensor 129. The detected interatomic force is supplied as a servo signal to a distance servo circuit 127, thereby controlling the distance between the probe 122 and the recording layer 121a. A recording pulse generating circuit 126 applies a voltage pulse to a portion between the probe 122 and the recording layer 121a, thereby forming a recording bit onto the recording layer 121a. On the other hand, while a reproduction bias generating circuit 125 applies a bias voltage to the portion between the probe 122 and the recording layer 121a, a current under the bias voltage is detected by a current detecting circuit 128. By executing a predetermined process to the detected current by a reproduction signal processing circuit 133, data is thereby formed reproduction reconstruction data.

Among the above recording and reproducing apparatuses, however, the apparatus shown in FIG. 1 in which the distance between the probe and the recording layer is controlled by using the tunnel current has a problem such that noises due to a fluctuation of the surface shape of the recording layer, film thickness, film quality, or the like are mixed into the reproduction information, so that there is a case where a reproduction error occurs.

The apparatus shown in FIG. 2 in which the distance between the probe and the recording layer is controlled by the interatomic force is excellent as compared with the apparatus shown in FIG. 1 with respect to a point that the noises which are generated due to a fluctuation of the surface shape of the recording layer can be perfectly separated from the reproduction information. In the case where there is a fluctuation of the film thickness or film quality in the recording layer, however, there is a problem since there is a fear that the noises which are generated by those fluctuations are still mixed into the reproduction information.

The problems in the case where there is a fluctuation of the film thickness of the recording layer will now be described further in detail hereinbelow with reference to FIGS. 3A to 3F.

FIG. 3A is a schematic diagram of the recording layer and the probe in the case where there are fluctuations of the probe and film thickness. The diagram illustrates the recording layer such that a film thickness of each of recording regions 3 to 5 among recording regions 1 to 11 is smaller than a reference film thickness and a film thickness of each of the recording regions 9 and 10 is larger than the reference film thickness. The recording region in the ON state among the recording regions 1 to 11 is shown by a hatched region.

As shown in FIG. 3A, in a state in which a contacting state of the probe 102 and the recording layer 101a is held constant, while the probe 102 is scanned in the direction shown by an arrow A in the diagram along each of the recording regions 1 to 11, a reproduction bias voltage $V_0$ as one of the reproducing conditions is applied as shown in FIG. 3B, so that a detection current as shown in FIG. 3C is obtained. That is, a change in detection current occurs because, in addition to a change corresponding to a conductivity change of the recording layer 101a in the recording region in the ON state, a change corresponding to the film thickness fluctuation of the recording layer 101a is mixed as noises. The detection current is output to the reproduction signal processing circuit. In the reproduction signal processing circuit, the detection current is first sampled by a reproduction timing signal shown in FIG. 3D, thereby obtaining reproduction sampling data as shown in FIG. 3E. Subsequently, by comparing the reproduction sampling data with a judgment level as another one of the reproducing conditions, reproduction reconstruction data shown in FIG. 3F is obtained. A voltage value of the judgment level signal is set to the intermediate value between the recording region output value in the ON state at a standard film thickness and a standard film quality and the recording region output value in the OFF state and is a fixed value which has previously been obtained by experiments. As shown in FIG. 3F, in the reproduction reconstruction data obtained, actually, the recording regions 3 and 5 in the OFF state are judged as regions in the ON state and the recording region 10 in the ON state is judged as a region in the OFF state, so that a reproduction error occurs.

Although the case where there is a fluctuation in the film thickness has been described above, an almost similar problem also occurs with respect to a fluctuation of the film quality. Therefore, in the conventional recording and reproducing apparatus, it is difficult to distinguish the reproduction information from the noises which are generated due to the fluctuations of the film thickness and film quality. There is a fear such that the reliability of the recording and reproducing system is remarkably lost excluding the case where no defect exists in the recording layer and the film thickness and film quality are ideally uniform.

On the other hand, the reproduction bias voltage is set in a manner such that in the standard film thickness, current changes in the ON state and OFF state can be preferably detected in a dynamic range of the current detecting system. In the case where the film thickness largely fluctuates from the standard value, however, there is a problem since there is a fear that the detected current value is deviated from the dynamic range. As an extreme example, in the case where the reproducing condition such as a reproduction bias voltage or the like exceeds a recording threshold value of a recording voltage or the like in association with a large fluctuation of the film thickness or film quality, there is also a problem such that an area other than a desired recording area is shifted to the ON state.

SUMMARY OF THE INVENTION

It is an object of the invention to provide a recording and reproducing apparatus in which even when a change such as film thickness fluctuation, film quality fluctuation, or the like exists in a recording layer, the occurrence of an inconvenience such as a reproduction error or the like which is caused by such a change can be prevented and a high reliability is obtained.

To accomplish the above object, according to the present invention, there is provided an information recording and reproducing apparatus for recording and reproducing information to/from a recording medium by using a probe, comprising: means for reproducing recording bits formed on the recording medium on the basis of a physical amount which occurs between the probe and the recording medium; means for detecting a state of the recording medium on the basis of the physical amount before the recording bits are reproduced; and correcting means for correcting reproducing conditions of the reproducing means on the basis of the detected state of the recording medium.

According to the recording and reproducing apparatus of the invention, before the recording bits are reproduced, the state (film thickness, film quality, or the like) of the recording medium which is reflected to the physical amount which occurs between the probe and the recording medium is detected and the reproducing conditions of the recording bits are corrected by the correcting means on the basis of the state of the recording medium. Due to this, the reproducing conditions are corrected in correspondence to a change in each of the recording areas of the recording medium and the optimum reproducing conditions can be independently set for each recording area during the reproducing operation. Thus, the reproduction error which occurs due to the change in each recording area of the recording medium is prevented.

The above construction will be described in detail in the following embodiments.

BRIEF DESCRIPTION OF THE DRAWINGS

FIGS. 3A to 3F are diagrams for explaining a reproducing method by the conventional recording and reproducing apparatus, in which FIG. 3A is a schematic view of a recording layer and a probe, and FIGS. 3B to 3F are timing charts of a reproduction bias signal, detection current, reproduction timing signal, reproduction sampling data and reproduction reconstruction data, respectively;

FIGS. 5A to 5G are diagrams for explaining a reproducing method according to the recording and reproducing apparatus shown in FIG. 4, in which FIG. 5A shows a schematic diagram of a probe and a recording layer, and FIGS. 5B to 5G are timing charts of a reproduction bias sample and hold signal, reproduction bias signal, detection current, reproduction timing signal, reproduction sampling data and reproduction reconstruction data, respectively;

FIGS. 7A to 7H are diagrams for explaining a reproducing method according to the recording and reproducing apparatus shown in FIG. 6, in which FIG. 7A is a schematic diagram of a probe and a recording layer, and FIGS. 7B to 7H are timing charts of a reproduction bias signal, detection current, judgement level timing signal, judgement level signal, reproduction timing signal, reproduction sampling data and reproduction reconstruction data, respectively; and FIG. 8 is a schematic block diagram of the third embodiment of a recording and reproducing apparatus of the invention.

DETAILED DESCRIPTION OF THE PREFERRED EMBODIMENTS

Embodiments of the present invention will now be described with reference to the drawings hereinbelow.

(First embodiment)

Figure 1:
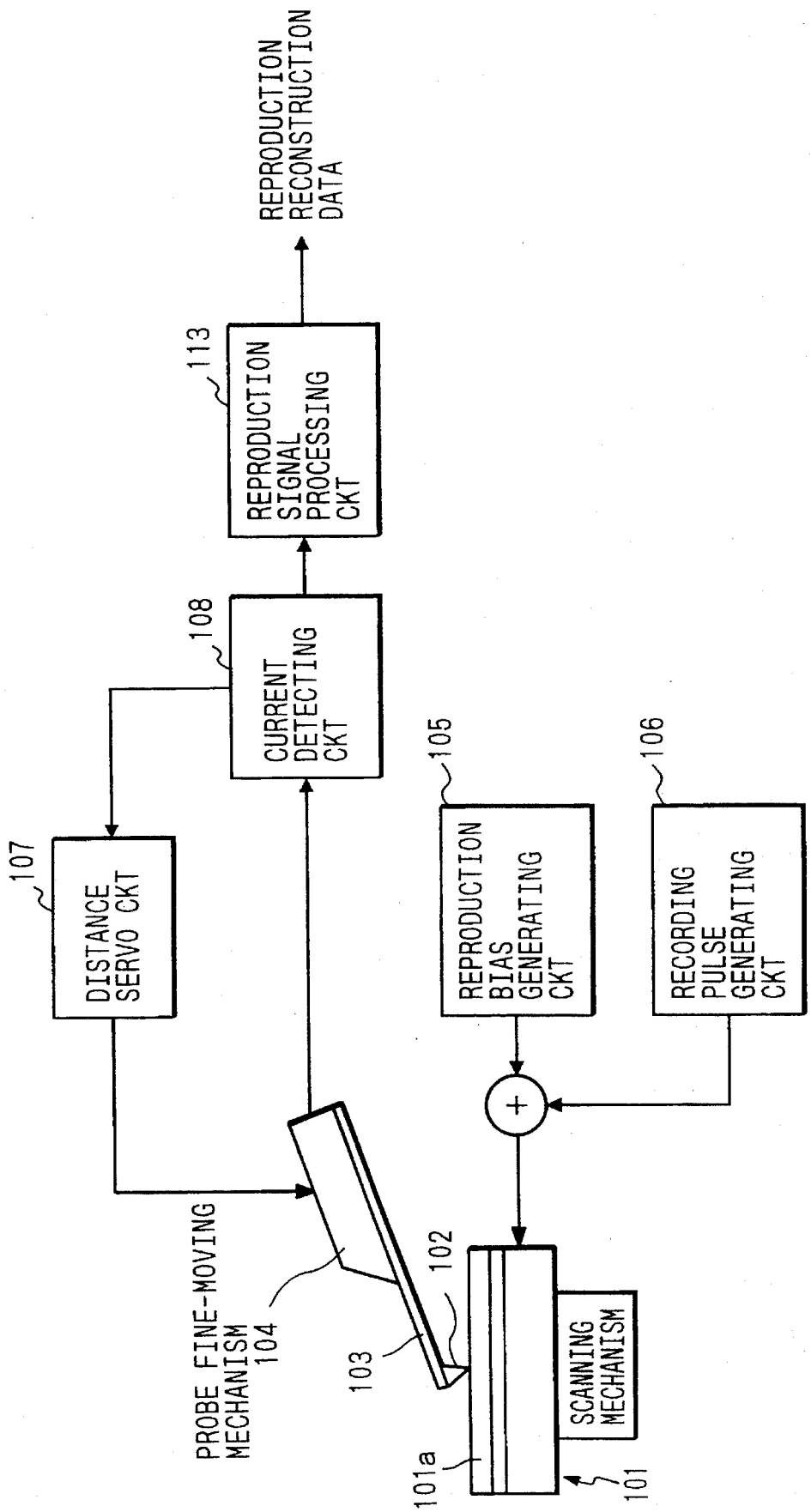
FIG. 1 is a schematic block diagram of an example of a conventional recording and reproducing apparatus.
Figure 2:
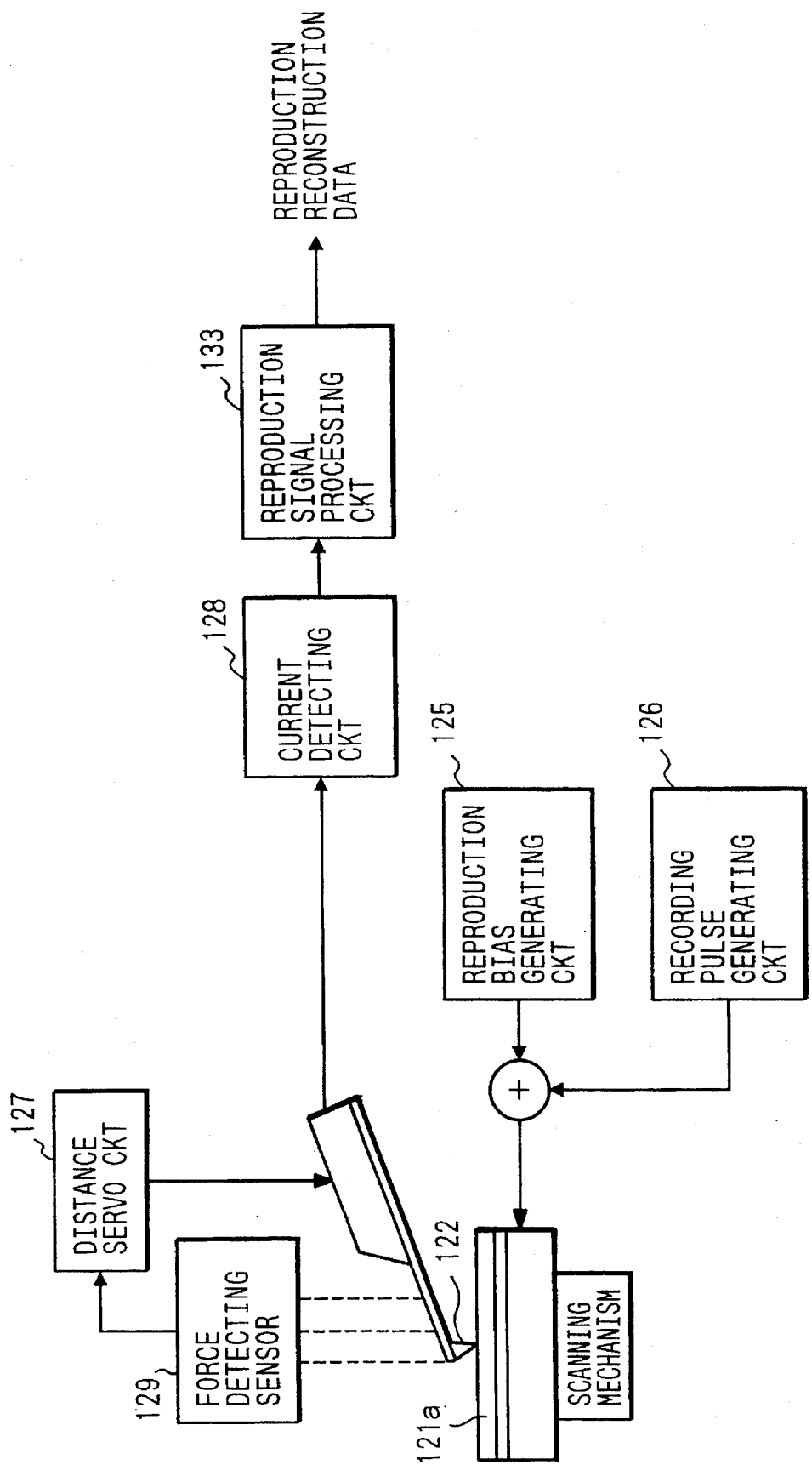
FIG. 2 is a schematic block diagram of another example of the conventional recording and reproducing apparatus.
Figure 3A:
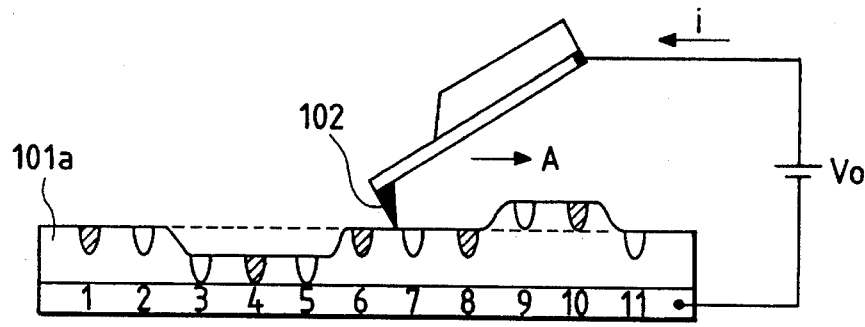
Figure 3B:
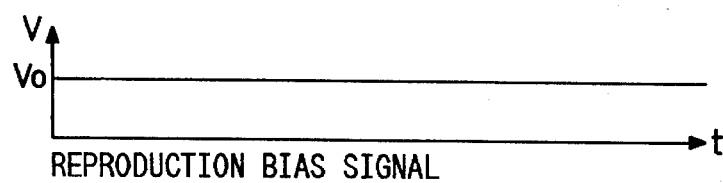
Figure 3C:
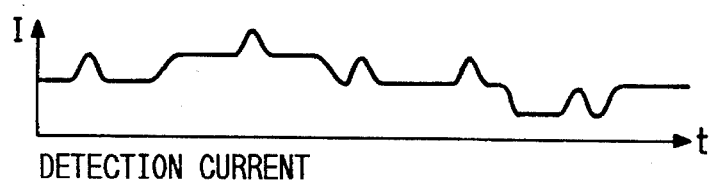
Figure 3D:
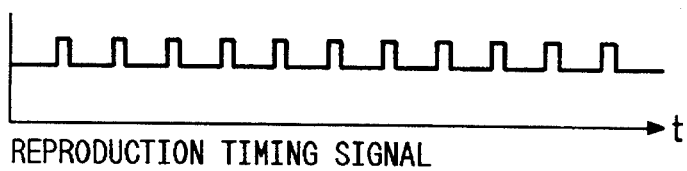
Figure 3E:
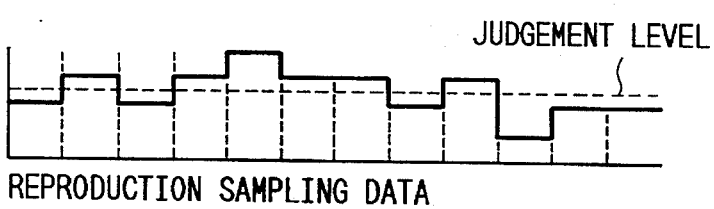
Figure 3F:
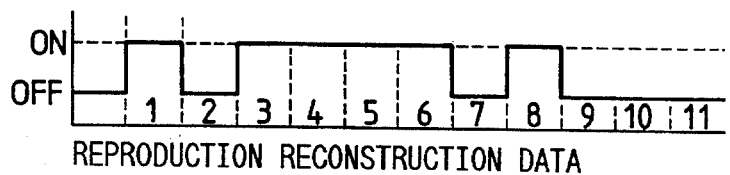
Figure 4:
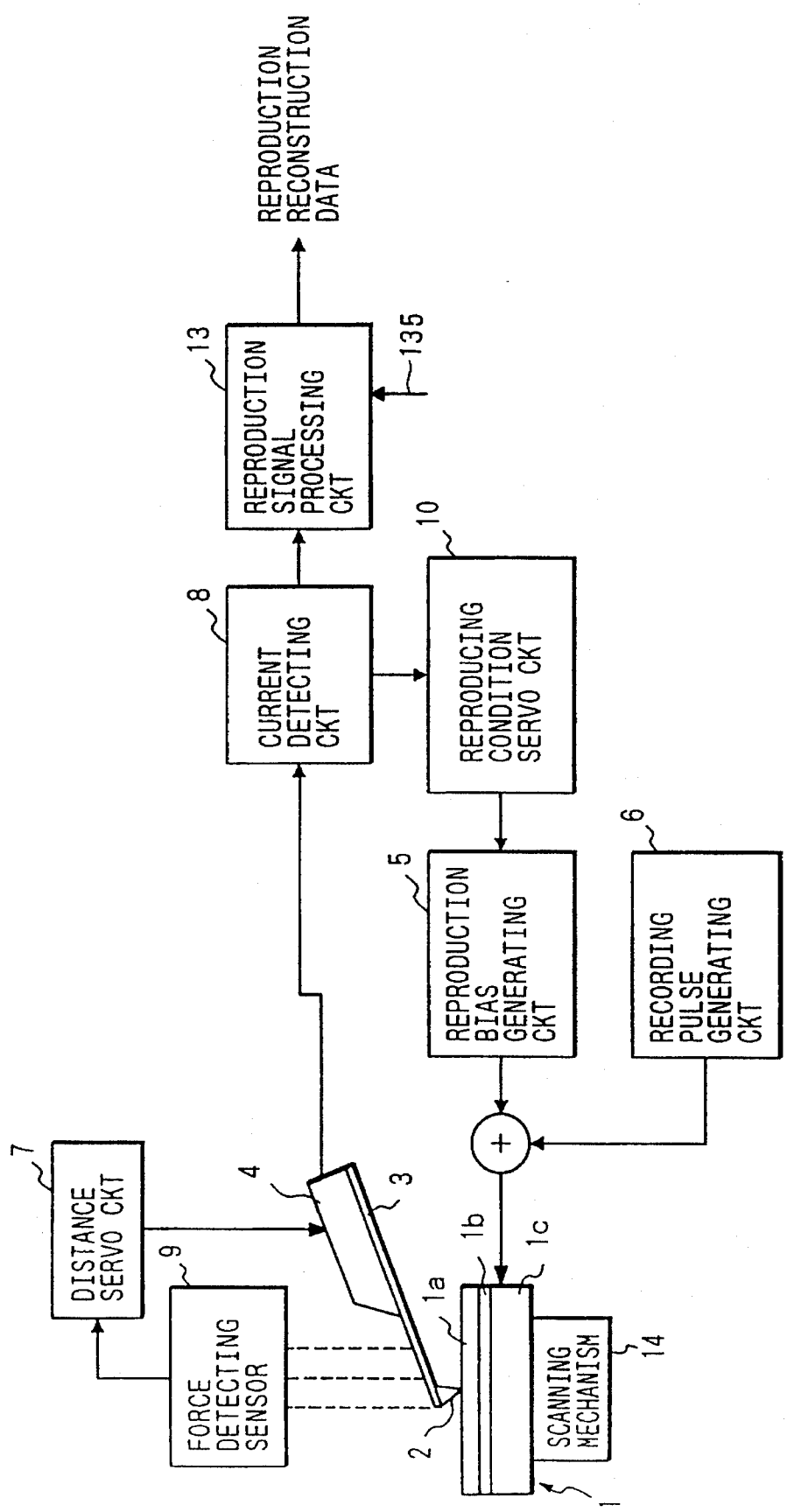
FIG. 4 is a schematic block diagram of the first embodiment of a recording and reproducing apparatus according to the present invention.

FIG. 4 is a schematic block diagram of the first embodiment of a recording and reproducing apparatus of the invention. In the recording and reproducing apparatus, a tunnel current, an electric field radiation current, a contact current, or a modulation signal of each of them is used as a physical amount which is detected from a recording layer. A reproduction bias voltage as one of signal detecting conditions is used as a target of reproducing conditions to be corrected. A construction of the apparatus will now be described hereinbelow.

A recording medium 1 is formed by laminating an under electrode 1b and a recording layer 1a onto a substrate 1c. Polyimide is used as a material of the recording layer 1a and a built-up film of ten monomolecular film layers are formed on the surface of the under electrode 1b by a Langmuir-Blodgett's method (cumulative method). Polyimide used in the embodiment is a kind of an organic compound of the π electron conjugate system and can be used as an erasable recording medium by using a principle such that the conductivity of the film is reversibly changed by applying a voltage. It has been confirmed by experiments that the conductivity is increased by three or four digits by applying a voltage that is equal to or larger than a threshold value.

A probe 2 made of a conductive material having a sharp tip is arranged so as to face the recording layer 1a of the recording medium 1. The probe 2 is supported to a free edge portion of an elastic member 3 of the cantilever bridge type. The distance between the recording layer 1a and the probe 2 can be changed by a probe micro-moving mechanism 4. When the probe 2 is allowed to approach the recording layer 1a to a position of a distance of tens of nm to a few nm, an interatomic force is generated between the probe 2 and the recording layer 1a. However, by providing a force detecting sensor 9 of the optical lever type, tunnel current detecting type, or the like for detecting an elastic deformation of the elastic member 3 due to the interatomic force and by feedback controlling the probe micro-moving mechanism 4 through a distance servo circuit 7 so that the detection force is always constant, the distance between the probe 2 and the recording layer 1a is held constant. In the actual recording and reproducing apparatus, a plurality of elastic members 3 are formed on the same substrate by a micromechanics technique and the probe 2 and the probe micro-moving mechanism 4 are provided for each of the elastic members 3. However, explanation will now be made by paying attention to only one of the elastic members 3 for simplicity of explanation.

According to the above control method, as for the detection force by the force detecting sensor 9, there are two cases: namely, a case of an attracting force region (the distance between the probe 2 and the recording layer 1a is larger than 0) and a case of a repulsive force region (the distance between the probe 2 and the recording layer 1a is equal to 0, namely, a contact state). In many cases, the detection force is used in the repulsive force region which is excellent in a detecting sensitivity. By setting an elastic constant of the elastic member 3 to a value that is fairly smaller than that of the surface of the recording layer 1a, the contact state between the probe 2 and the recording layer 1a can be held almost constant even when the feedback control by the probe micro-moving mechanism 4 is not executed.

A recording pulse generating circuit 6 is provided to form an ON bit to the recording layer 1a by applying a voltage pulse for recording to a portion between the recording layer 1a and the probe 2 in the recording mode. On the other hand, a reproduction bias generating circuit 5 is provided to apply a bias voltage for reproduction to the portion between the recording layer 1a and the probe 2 in the reproducing mode and has an adding circuit and a sample and hold circuit. A current detecting circuit 8 comprises a current/voltage converting circuit and a logarithm converting circuit and detects a current as a physical amount which is generated by applying the bias voltage by the reproduction bias generating circuit 5 and sends the detected current to a reproducing condition servo circuit 10 and a reproduction signal processing circuit 13. The reproducing condition servo circuit 10 as correcting means has a differential circuit and an amplifying circuit and forms a reproducing condition correction servo signal on the basis of a detection current signal derived by the current detecting circuit 8 and sends the signal to the reproduction bias generating circuit 5. The reproduction signal processing circuit 13 executes a predetermined process, which will be explained hereinafter, to the detection current derived by the current detecting circuit 8, thereby obtaining reproduction reconstruction data. A scanning mechanism 14 relatively scans the recording layer 1a and the probe 2.

A recording and reproducing method by the recording and reproducing apparatus will now be described.

First, the recording is executed as follows. In a state in which the distance between the recording layer 1a and the probe 2 is held constant (including the contact state), while relatively scanning the recording medium 1 and the probe 2, a recording voltage pulse which is equal to or larger than a recording threshold value is applied to the portion between the recording layer 1a and the probe 2 by the recording pulse generating circuit 6. ON bits are sequentially formed to desired recording areas of the recording layer 1a.

Figure 5A:
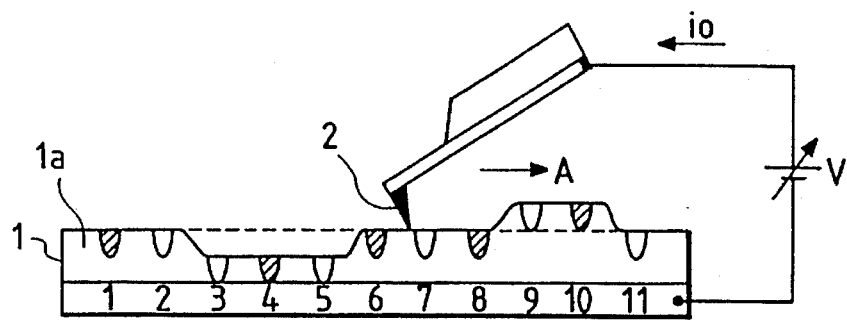
Figure 5B:
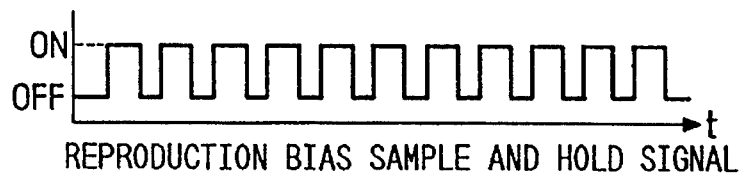

The reproducing mode will now be described with reference to FIGS. 5A to 5G. FIGS. 5A to 5G are diagrams for explaining a reproducing method by the recording and reproducing apparatus shown in FIG. 4. FIG. 5A is a schematic diagram of the probe and the recording layer having a fluctuation in film thickness. FIG. 5A shows the recording layer 1a such that the layer has the recording areas 1 to 11 along the scanning direction A of the probe 2 and a film thickness of each of the recording areas 3 to 5 among the recording areas 1 to 11 decreases as compared with the reference film thickness and a film thickness of each of the recording areas 9 and 10 increases more than the reference film thickness. Among the recording areas 1 to 11, the area in the ON state is shown by a hatched region. FIGS. 5B to 5G are timing charts of a reproduction bias sample and hold signal, a reproduction bias signal, a detection current, a reproduction timing signal, reproduction sampling data, and reproduction reconstruction data, which will be explained hereinafter, respectively. The position of each of the recording areas 1 to 11 in FIG. 5A is shown in correspondence to a time base of each timing chart.

First, in a state in which the contact state of the recording layer 1a and the probe 2 is held constant, the probe 2 is moved in the direction shown by an arrow in the diagram while applying a standard bias voltage V corresponding to a proper bias for the standard film thickness of the recording layer 1a by the reproduction bias generating circuit 5, thereby sequentially scanning on the recording areas 1 to 11. A current which is generated in this instance is detected by the current detecting circuit 8. After that, the current detecting circuit 8 sends the detection current signal to the reproducing condition servo circuit 10.

In the reproducing condition servo circuit 10, the differential circuit outputs a difference signal between the detection current signal and the set value corresponding to the proper current value in a case of the standard film thickness, and the reproducing condition correction servo signal formed through the amplifying circuit is sent to the reproduction bias generating circuit 5.

An amplification factor of the amplifying circuit is previously adjusted and set in accordance with a response frequency of the circuit and a scanning frequency of a reproducing probe and the like in a manner such that the optimum negative feedback control is executed on the basis of the differential output and the detection current is always held to a set value.

Figure 5C:
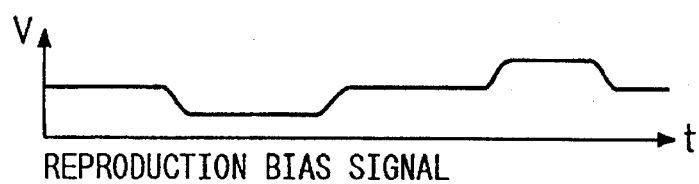

In the reproduction bias generating circuit 5, first, the standard bias voltage V and the reproducing condition correction servo signal sent from the reproducing condition servo circuit 10 are added by the adding circuit. After that, the sample and hold circuit executes a control in a manner such that the added value is held to a value at that time point at a timing just before the probe 2 entering each of the recording areas 1 to 11, thereby correcting the reproduction bias signal. Due to this, an influence on the current change by the change in conductivity of the recording layer 1a in the recording area in the ON state is eliminated. The corrected reproduction bias signal is set to the value corresponding to the fluctuation in film thickness of the recording layer 1a as shown in FIG. 5C.

Figure 5D:
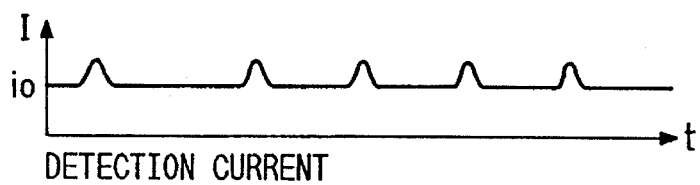

FIG. 5D shows the detection current which is detected under the corrected reproduction bias signal. As mentioned above, since the correction of the reproduction bias signal is executed for only the current change in association with the film thickness fluctuation of the recording layer 1a, film thickness fluctuation noises are eliminated from the detection current detected under the corrected reproduction bias signal. The signal to which only the current change by the conductivity change in each of the recording areas 1, 4, 6, 8, and 10 in the ON state was reflected is consequently formed.

Figure 5E:
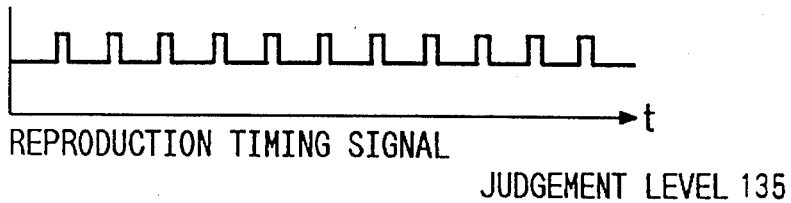
Figure 5F:
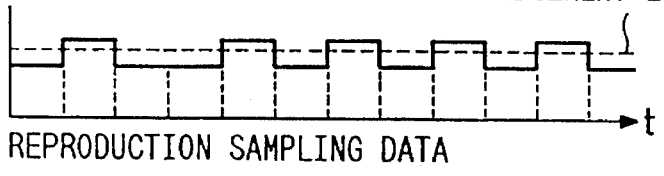
Figure 5G:
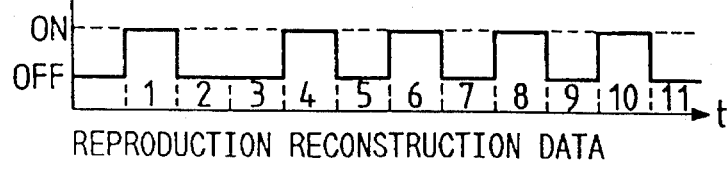

In the reproduction signal processing circuit 13, first, the detection current obtained as mentioned above is sampled by a reproduction timing signal at which a pulse is generated at the timing corresponding to each of the recording areas 1 to 11 shown in FIG. 5E. By comparing the reproduction sampling data derived with a judgment level signal 135, reproduction reconstruction data in which only each of the recording areas 1, 4, 6, 8, and 10 in the ON state was accurately reconstructed is obtained as shown in FIG. 5G.

According to the embodiment as described above, in the reproducing step, the film thickness fluctuation noises which are reflected to the detection current detected by the current detecting circuit 8 are used as a servo signal and the reproduction bias voltage which is given by the reproduction bias generating circuit 5 is corrected. Thus, the influence by the film thickness fluctuation noises is set off and the current change of the ON/OFF state of the recording layer 1a is held at the set level at which it can be preferably detected in the dynamic range of the current detecting system. Consequently, the reproduction error which is caused by the film thickness fluctuation can be prevented.

Although the proper reproduction bias voltage rises with an increase in number of recording layers 1a, it has been confirmed that the detection current under the proper reproduction bias voltage is independent of the film thickness fluctuation and doesn't largely fluctuate. According to this method, even a situation such that the reproduction bias voltage exceeds the recording threshold voltage can be avoided. Thus, a transition of the recording layer 1a to the ON state in an area other than the desired recording area is eliminated.

Although the embodiment has been described with respect to the example of the case where the correction of the reproducing conditions is stationarily executed during the series of reproducing operations excluding the recording area, the invention is not limited to such an example. The correction also can be executed in an area near the recording area just before the reproduction by the timing signal or also can be performed every predetermined period or every predetermined interval such as for every recording area column. On the other hand, in order to eliminate the influence on the current change of the recording area in the ON state in the correction of the reproduction bias voltage, the control by the sample and hold circuit of the reproducing condition servo circuit 10 has been executed. However, by setting a cut-off frequency of the reproducing condition servo circuit 10 to a value lower than a space frequency of the recording area, the sample and hold control is not always necessary.

(Second embodiment)

Figure 6:
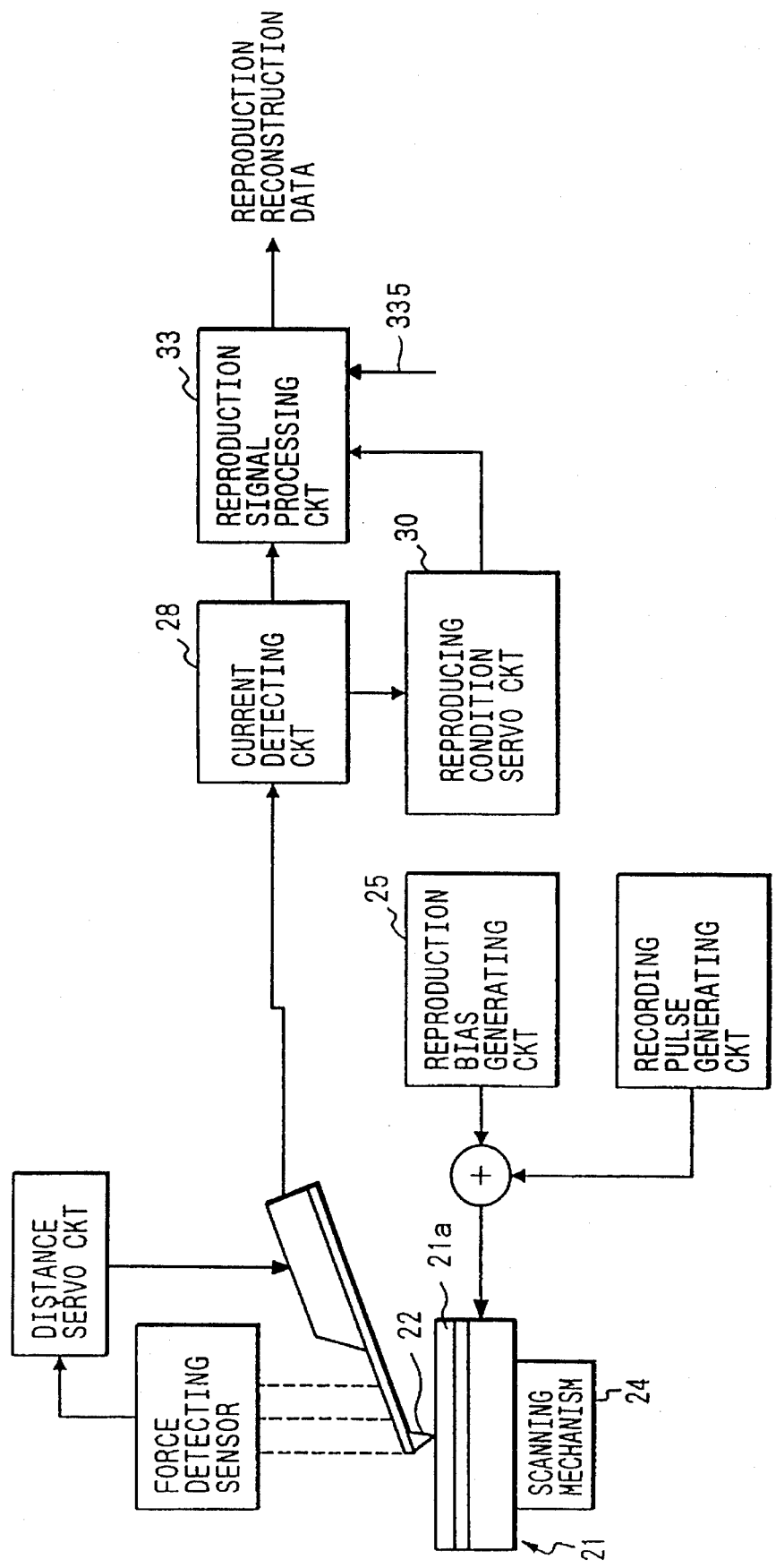
FIG. 6 is a schematic block diagram of the second embodiment of a recording and reproducing apparatus of the invention.

FIG. 6 is a schematic block diagram of the second embodiment of a recording and reproducing apparatus of the invention. The recording and reproducing apparatus of the second embodiment also uses a tunnel current, an electric field radiation current, a contact current, or a modulation signal of each of them as a physical amount that is detected from the recording layer in a manner similar to the first embodiment. However, the second embodiment differs from the first embodiment with respect to a point that a judgment level signal as one of the signal processing conditions is used as a target of the reproducing conditions to be corrected. Namely, on the construction, the second embodiment differs from the first embodiment with respect to a point that a reproducing condition servo circuit 30 as correcting means executes a servo control to the judgment level signal which is formed by a reproduction signal processing circuit 33 instead of the reproduction bias generating circuit 25. Since the other construction is similar to that of the first embodiment, its description is omitted.

In the operation of the recording and reproducing apparatus of the second embodiment, since a control method of the distance between a recording layer 21a of a recording medium 21 and a probe 22 and a recording method are similar to those in the first embodiment, their descriptions are omitted here. A reproducing method will now be described hereinbelow with reference to FIGS. 7A to 7H.

Figure 7A:
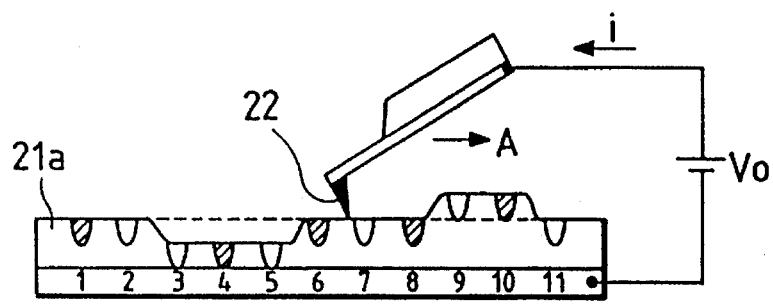

FIGS. 7A to 7H are diagrams for explaining the reproducing method according to the recording and reproducing apparatus shown in FIG. 6. FIG. 7A is a schematic diagram of the probe and the recording layer having a fluctuation in film thickness. The diagram shows the recording layer 21a such that it has recording areas 1 to 11 along the scanning direction A of the probe 22 and a film thickness of each of the recording areas 3 to 5 among the recording areas 1 to 11 decreases from a reference film thickness and a film thickness of each of the recording areas 9 and 10 increases from that of the reference film thickness. Among the recording areas 1 to 11, the areas in the ON state are shown by hatched regions. FIGS. 7B to 7H are timing charts of a reproduction bias signal, a detection current, a judgment level timing signal, a judgment level signal, a reproduction timing signal, reproduction sampling data, and reproduction reconstruction data, which will be explained hereinafter, respectively. The position of each of the recording areas 1 to 11 in FIG. 7A is shown in correspondence to a time base of each timing chart.

Figure 7B:
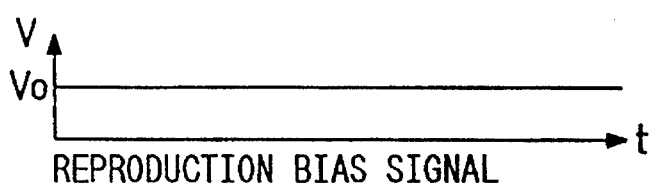
Figure 7C:
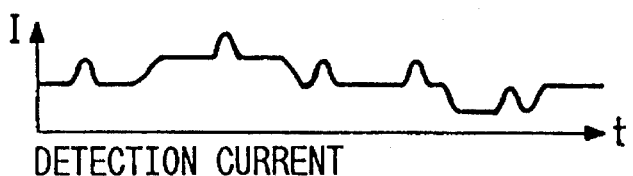

First, in a state in which the contact state of the recording layer 21a and the probe 22 is held constant, while a fixed bias voltage $V_0$ shown in FIG. 7B by a reproduction bias generating circuit 25, the probe 22 is moved in the direction shown by an arrow in the diagram, thereby sequentially scanning each of the recording areas 1 to 11. A current which is generated in this instance is detected by a current detecting circuit 28. However, the detection current is influenced by noises in association with a fluctuation of film thickness of the recording layer 21a as shown in FIG. 7C.

The detection current signal derived from the current detecting circuit 28 is sent to the reproducing condition servo circuit 30. In the reproducing condition servo circuit 30, a standard current value corresponding to the number of standard layers of the recording layer is compared with the detection current value and its difference signal is formed. The difference signal is multiplied by a correction coefficient signal from a correction coefficient forming circuit, so that a judgment level correction servo signal is output. Although the correction coefficient forming circuit outputs the optimum correction coefficient which has previously been experimentally obtained, the correction coefficient can be approximated by a constant or, further strictly speaking, a correction coefficient in which an arithmetic operating process of an exponential function or the like was executed in accordance with a magnitude of the difference signal also can be used.

Figure 7D:
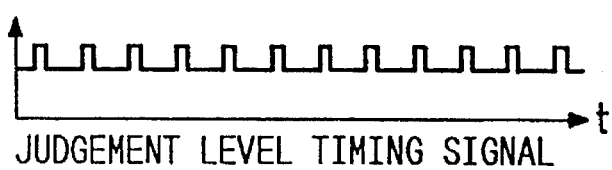
Figure 7E:
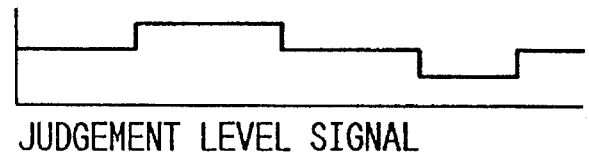

The judgment level correction servo signal formed by the reproducing condition servo circuit 30 is sent to the reproduction signal processing circuit 33. In the reproduction signal processing circuit 33, first, as shown in FIG. 7D, the judgment level correction servo signal is sampled by a judgment level timing signal at which a pulse is generated at the timing corresponding to a phase (in the embodiment, a phase which is earlier than the phase of the recording area by π) excluding the recording area. An influence on the current change by the conductivity change in the recording area in the ON state is eliminated. After that, the sampled judgment level correction servo signal is added to a standard judgment level in the adding circuit, so that a judgment level signal to which the film thickness fluctuation noises as shown in FIG. 7E is obtained.

Figure 7F:
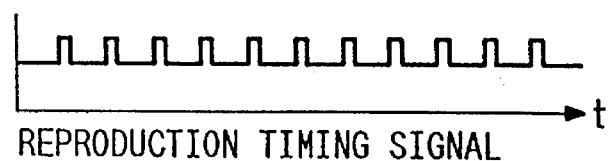
Figure 7G:
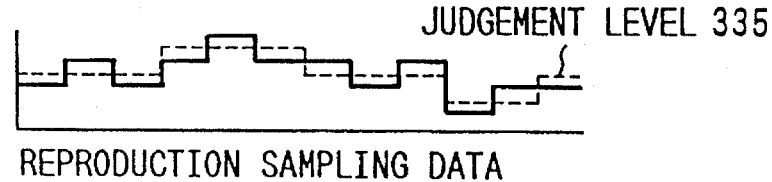
Figure 7H:
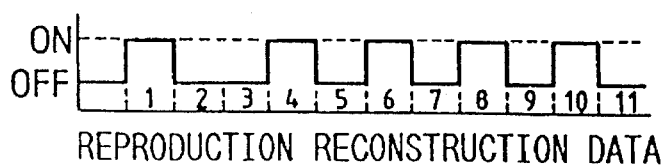

On the other hand, in the reproduction signal processing circuit 33, the detection current signal obtained by the current detecting circuit 28 is sampled by a reproduction timing signal shown in FIG. 7F, thereby obtaining reproduction sampling data shown in FIG. 7G. After that, the reproduction sampling data is compared with the judgment level signal 335 shown in FIG. 7E through a phase compensating circuit, a differential circuit, an absolute value circuit, or the like. Due to this, as shown in FIG. 7H, reproduction reconstruction data in which only the recording areas 1, 4, 6, 8, and 10 in the ON state were accurately reconstructed is obtained.

(Third embodiment)

FIG. 8 is a schematic block diagram of the third embodiment of a recording and reproducing apparatus of the invention. The recording and reproducing apparatus of the third embodiment uses an electrostatic capacitance as a physical amount which is detected from a recording layer and feedback controls it to the reproducing conditions.

A recording layer 41a of a recording medium 41 which is used in the recording and reproducing apparatus of the embodiment is constructed by a silicon oxide film and a silicon nitride film formed on a silicon substrate and is formed as follows. A silicon oxide film having a thickness of 1 to 2 nm is formed onto a boron doped P type silicon [100] substrate by a chemical treatment using HCl. After that the silicon oxide film having a thickness of 30 to 50 nm is formed by an LPCVD (low pressure CVD) method, thereby obtaining the recording layer 41a. The nitride film contains a large amount of trap level. It has been confirmed that by applying a voltage pulse for recording to a portion between a probe 42 and the recording layer 41a, electrons are trapped into the nitride film and that by applying a voltage pulse of an opposite polarity, the electrons are discharged. Therefore, attention is paid to the nitride film as an erasable charge accumulating type recording medium.

By using such a charge accumulating type recording medium as a recording medium 41, information can be reproduced by detecting the electrostatic capacitance in the recording area. That is, since a generation threshold voltage of a depletion layer which is generated in a P-type silicon substrate interface is changed by an overvoltage which is generated by the accumulation of the charges, the electrostatic capacitance of the recording layer 41a which changes in correspondence to the generation state of the depletion layer under a proper reproduction bias voltage is detected as a physical amount, so that the presence or absence of the accumulated charges can be detected.

In this case, since the optimum reproduction bias voltage fluctuates due to variations of the film thicknesses of the nitride layer and oxide layer and a variation of the doping level at the silicon interface, in the case where the recording voltage pulse is constant as in the conventional recording and reproducing apparatus, there is a fear of occurrence of the reproduction error due to the fluctuation noises of the recording layer.

Therefore, in the embodiment, the electrostatic capacitance under the standard bias voltage which changes in accordance with the fluctuations of the recording layer mentioned above is detected. The electrostatic capacitance or its voltage differentiation signal is used as a servo signal, thereby correcting the reproduction bias voltage.

As shown in FIG. 8, a standard bias voltage which is equal to or less than a recording threshold value by a reproduction bias generating circuit 45 is multiplexed with a modulation bias voltage by a modulation bias generating circuit 52. The multiplexed bias voltage is applied to a portion between the recording layer 41a and the probe 42. In this state, an electrostatic capacitance of the recording layer 41a is detected by a capacitance detecting circuit 51 comprising an LC resonator, a lock-in detector, and the like. The detected electrostatic capacitance or its voltage differentiation signal is sent to a reproducing condition servo circuit 50.

In the reproducing condition servo circuit 50, a difference signal between the detected capacitance (differentiation) and a standard electrostatic capacitance (differentiation) value of the recording layer 41a is output from the differential circuit. After that, a reproducing condition correction servo signal formed through the amplifying circuit is sent to the reproduction bias generating circuit 45. An amplification factor of the amplifying circuit is previously adjusted and set in accordance with a response frequency of the circuit, a scanning frequency of a reproduction probe, and the like in a manner such that the optimum negative feedback control is executed on the basis of the differential output and the detected (differentiation) capacitance is always held to a set value (zero).

In the reproduction bias generating circuit 45, the standard reproduction bias voltage and the reproducing condition correction servo signal are added.

Since a control method of the distance between the probe 42 and a recording layer 42a and a recording method in the embodiment are similar to those in the first embodiment, their descriptions are omitted here.

As described above, by correcting the reproduction bias voltage, even when there is a fluctuation in the recording layer 41a, the correction to the optimum reproduction bias voltage is executed in a real time in correspondence to a change in the recording layer 41a. A reproduction error which is caused due to the fluctuation in the recording layer 41a can be eliminated.

In the embodiment, since a cut-off frequency of the reproducing condition servo circuit 50 has been set to a value lower than a recording area space frequency, the sample and hold control to eliminate an influence of the electrostatic capacitance in the recording area in the ON state is not executed. However, a sampling operation similar to the sampling operation executed in the first or second embodiment also can be executed as necessary.

Although each of the above embodiments has been described with respect to an example in which the distance between the probe and the recording layer is controlled on the basis of the force detection, the invention is not limited to it but the distance between them also can be controlled by using a detection current as a servo signal. In this instance, in a case of controlling the distance between them by a constant current, a recording layer signal which is sent from the current detecting circuit to the reproducing condition servo circuit is what is called a topo current corresponding to a differential output of the set current. In a case of controlling the distance between them by a constant height, the recording layer signal is a current signal as a detection current. By adding the reproduction bias or distance control signal and lock-in detecting a response current component, a film quality which reflects an electron state such as electron state density, barrier height, or the like which is independent of the film shape or film thickness as a recording layer signal also can be set.

Although each of the above embodiments has been described with respect to the correction of the film thickness fluctuation noises, the correction regarding the film quality can be executed. Or, even in the case where both the film quality fluctuation and the film thickness fluctuation mixedly exist as a more general case, the correction by quite a similar method also can be obviously performed. As a physical amount which occurs between the recording medium and the probe, it is possible to use a signal which reflects a state of the recording medium such as tunnel current, field radiation current, contact current, electrostatic capacitance, interatomic force, magnetic force, electrostatic force, evanescent light, or the like, or a modulation signal of each of them. With respect to the state of the recording medium, electric characteristics, magnetic characteristics, dynamical characteristics, optical characteristics, surface shape, or internal structure of the recording layer also can be used in accordance with the above physical amount. To detect the states of the recording medium mentioned above, a circuit which commonly uses the current detecting circuit for data reproduction or the electrostatic capacitance detecting circuit also can be used as in the above embodiments or new exclusive-use detecting means also can be provided.

As described above, according to the recording and reproducing apparatus of the invention, the state of the recording medium is detected before the recording bits are reproduced and the reproducing conditions of the recording bits are corrected on the basis of the detected recording medium state, so that the optimum reproducing conditions can be independently set for each of the recording areas during the reproducing operation. Therefore, information can be reproduced at a high reliability without a reproduction error which is caused by a change in each recording area of the recording medium, an over detection band of the reproduction signal, damage of the recording information, and the like.

On the other hand, by feedback controlling the state of the recording medium to the reproducing conditions by the correcting means, the reproducing conditions can be corrected in a real time.

What is claimed is:

1. An information recording and/or reproducing apparatus for effecting at least one of recording information on and reproducing information from a recording medium by using a probe, said apparatus comprising:

detecting means for detecting a physical characteristic which occurs between the probe and the recording medium;

reproducing means for reproducing recording bits formed on the recording medium by utilizing said detecting means under a predetermined reproducing condition;

state detecting means for detecting a state of the recording medium in accordance with the detected physical characteristic, before said reproducing means reproduces the recording bits; and correcting means for correcting a reproducing condition of said reproducing means in accordance with the detected state of the recording medium.

2. An apparatus according to claim 1, wherein the state detected by said detecting means denotes a film thickness and a film quality of the recording medium.

3. An apparatus according to claim 1, further comprising means for applying a voltage between the probe and the recording medium, and wherein the reproducing condition corrected by said correcting means is a magnitude of the applied voltage.

4. An apparatus according to claim 1, wherein said reproducing means comprises means for comparing a signal corresponding to the detected physical characteristic with a predetermined threshold reproduction signal and means for generating reproduction data, and wherein the reproducing condition corrected by said correcting means is a level of the threshold signal.

* * * * *

UNITED STATES PATENT AND TRADEMARK OFFICE
CERTIFICATE OF CORRECTION

PATENT NO. : 5,623,295
DATED : April 22, 1997
INVENTOR(S) : Etsuro KISHI, ET AL.

It is certified that error appears in the above-indentified patent and that said Letters Patent is hereby corrected as shown below:

COLUMN 2:

Line 39, "data is thereby formed" should be deleted;
Line 40, "data." should read --data is thereby formed.--.

COLUMN 7:

Line 6, "on" should be deleted.

Signed and Sealed this

Seventh Day of October, 1997

Attest:

BRUCE LEHMAN

Attesting Officer

Commissioner of Patents and Trademarks